United States Patent [19]

Herran et al.

[11] Patent Number: 5,306,745
[45] Date of Patent: Apr. 26, 1994

[54] COMPOSITION FOR A PACKAGING FILM CONTAINING AN ADDITIVE

[75] Inventors: Vincent W. Herran, Greenville, S.C.; Livio Buongiorno, Milan, Italy

[73] Assignee: W. R. Grace & Co.-Conn., Duncan, S.C.

[21] Appl. No.: 989,999

[22] Filed: Dec. 11, 1992

Related U.S. Application Data

[63] Continuation of Ser. No. 652,699, Feb. 8, 1991, abandoned.

[30] Foreign Application Priority Data

Mar. 1, 1990 [GB] United Kingdom ............. 9004650.9

[51] Int. Cl.[5] ........................ B32B 27/18; C08K 9/08
[52] U.S. Cl. .................................. 523/205; 428/407; 525/222; 525/240; 525/936; 264/349; 264/211
[58] Field of Search ................ 264/73, 75, 171, 173, 264/349, 211; 428/320.2, 321.1, 321.5, 407; 525/931, 936, 240, 222; 523/200, 210, 206, 207, 205; 427/212, 213.3; 526/72; 106/15.05; 424/486, 497

[56] References Cited

U.S. PATENT DOCUMENTS

| | | | |
|---|---|---|---|
| 3,433,573 | 3/1969 | Holladay et al. | 525/222 |
| 3,891,572 | 6/1975 | Moody et al. | 523/206 |
| 3,929,724 | 12/1975 | Miyauchi et al. | 525/222 |
| 3,968,060 | 7/1976 | Vincent et al. | |
| 4,086,297 | 4/1978 | Rei et al. | |
| 4,116,914 | 9/1978 | Coran et al. | 525/222 |
| 4,128,689 | 12/1978 | Heaps et al. | 264/75 |
| 4,284,444 | 8/1981 | Bernstein et al. | 264/212 |
| 4,624,814 | 11/1986 | McDougal | 264/349 |
| 4,828,780 | 5/1989 | Luker | 264/171 |
| 4,895,884 | 1/1990 | Benko et al. | 523/207 |

FOREIGN PATENT DOCUMENTS

| | | |
|---|---|---|
| 0197631 | 10/1986 | European Pat. Off. |
| 0215480 | 3/1987 | European Pat. Off. |
| 0228229 | 7/1987 | European Pat. Off. |
| 2100304 | 2/1972 | France |
| 1231569 | 5/1971 | United Kingdom |
| 1300640 | 12/1972 | United Kingdom |

Primary Examiner—Jeffery Thurlow
Assistant Examiner—Mathieu Vargot
Attorney, Agent, or Firm—Mark B. Quatt

[57] ABSTRACT

A composition includes a blend of an additive, such as a fungicide, encapsulated in a first thermoplastic resin and a second thermoplastic resin which has a lower melting point than the first resin. During extrusion of the blend, the second resin melts and surrounds the encapsulated additive before the first resin melts. Thus composition is especially useful in combination with a multilayer film including a core layer made up of the composition, and respective further layers laminated to each side of the core layer. These films are useful in packaging articles such as fruits and vegetables to protect them from fungal infections.

6 Claims, No Drawings

COMPOSITION FOR A PACKAGING FILM CONTAINING AN ADDITIVE

This application is a continuation of application Ser. No. 652,699 filed on Feb. 8, 1991, now abandoned.

The present invention relates to the preparation of packaging films which incorporate an additive, especially a fungicide, and to the use of such a film.

Fungicides are applied to a variety of articles in order to control fungal diseases. Various treatments can be used including dipping the article in a wash tank containing the fungicide, impregnating fungicide into a wrapper, crate liner or carton for the article and fumigating the article with fungicide in a special room, railway truck or tank.

It is particularly important to protect agricultural produce such as fruit, for example citrus fruit, from fungal diseases. We therefore sought to devise a packaging film in which citrus fruit could be wrapped and which would effectively prevent decay of the fruit due to fungal infection. However,, merely incorporating a fungicide in the core layer of multilayer film did not prove satisfactory for this purpose.

Several difficulties were discovered in merely blending a fungicide with a thermoplastic resin and extruding the blend to form the core layer of a multilayer film. A high loss of fungicide occurred during extrusion. Not only are fungicide losses costly but the odour and fumes generated are unpleasant. Further, the release of fungicide from the film was not controllable with respect to time.

We have now overcome these problems by encapsulating the fungicide in a polymer resin in the core layer. Further, the resin within which the fungicide is encapsulated has a higher melt temperature than a second resin with which it isoblended and extruded to form the core layer. This ensures that the pellets of encapsulated fungicide become fully surrounded with melted second resin before the higher melting resin encapsulating the fungicide melts during extrusion.

This approach has general applicability to other migrating additives. Accordingly, the present invention provides a process for the preparation of a multilayer film comprising a core layer, a respective further layer laminated to each side of the core layer and an additive capable of migrating within the film, which process comprises:

(i) blending the additive, encapsulated in a first thermoplastic resin, with a second thermoplastic resin which has a lower melting point than the first resin so that during extrusion of the blend the second resin melts and surrounds the encapsulated additive before the first resin melts; and (ii) coextruding (a) the resulting blend to provide one layer of the film and (b) respective thermoplastic resins to provide the other layers of the film.

The multilayer film may have, for example, three or five layers. In the case of a three layer film, the further layers laminated to the core layer form the outer layers of the film. In the case of a five layer film, the further layers laminated to the core layer form intermediate layers to which the outer layers of the film are laminated.

Preferably a heat-shrinkable multilayer film is formed by:

(a) coextruding a tape composed of the core layer, two outer layers and a respective intermediate layer between the core layer and each outer layer.
(b) quenching the tape;
(c) reheating the quenched tape; and
(d) orienting the reheated tape.

The invention further provides a method of packaging an article, which method comprises packaging the article in a multilayer film produced according to the process of the present invention. The present invention also provides a composition comprising a blend of (i') an additive encapsulated in a first thermoplastic resin and (ii') a. second thermoplastic resin which has a lower melting point than the first resin.

The blend formed in step (i) of the present process is preferably extruded as the core layer of the multilayer film. By incorporating the additive in the core layer, the additive is insulated by the said two further layers. Some of the additive generally migrates into the said two further layers, indeed into all of the layers of a film of more than three layers, during the coextrusion step (ii). However, these further layers allow the additive concentration to be maintained inside the film during cooling from melt to so-lid after extrusion. The additive thereafter slowly migrates to the film surface so that it is released from the film over a period of time. The initial absence of additive from the outer layers of the film avoids a high initial loss of additive caused by fumes at the exit of the extrusion die. The slow migration of the additive to the film surface also reduces volatile losses during film making at elevated temperatures.

The additive capable of migration may be, for example, a fungicide, wax or antifogging agent. The wax may be erucamide or behemamide. The antifogging agent may be glycerol monostearate or polyoxyethylated cetyl alcohol.

The fungicide is typically an organic fungicide. It may be a quinone, organic sulphur compound such as a di-f-hiocarbamate, an imidazoline or guanidine, a trichloromethylthiocarboximide or a chlorinated or-nitrated benzene. Preferred fungicides include 1-[2-(2,4-dichloro-phenyl)-2-(2-propenyloxy)ethyl]-1H-imidazole (Imazalil); 2,3,5,6-tetrachloro-1,4-benzoquinone (chloranil); 2,3-dichloro-1,4-naphthoquinone (dichlone); tetramethylthiuram disulphide; an ethylenebisdithiocarbamate such as disodium ethylenebisdithiocarbamate; heptadecyl-2-imidazolinium acetate (glyodin); N-(trichloromethylthio)-4-cyclohexane-1,2-carboxamide (captan); N-(trichloromethylthio)phthalimide (folpet); 2,3,5,6-tetrachloronitrobenzene; pentachloronitrobenzene; 1,2,4-trichloro-3,5-dinitrobenzene; 1,3,5-trichloro-2,4,6-trinitrobenzene; hexachlorobenzene and tetrachloroisophthalonitrile.

The additive is encapsulated in a first thermoplastic resin with a relatively high melt temperature, for example from about 170° to 240° C. The polymer may be an olefin polymer with a high molecular weight, typically about 6000 or more. The olefin polymer may therefore be an ethylene or propylene polymer, for example a homo- or copolymer. The olefin polymer may have a low density, of from about 0.900 g/cc to about 0.940 g/cc. It may be a high density polyolefin of from about 0.940 to about 0.965.g/cc.

The first resin is preferably a linear low density polyethylene (LLDPE). A LLDPE is typically a copolymer of ethylene with one or more $C_4$–$C_{10}$ alpha-olefins such as butene-1 and octene. The $C_4$-$C_{10}$ alpha-olefin is present in a minor amount. The LLDPE molecules comprise long-chains with few side chains, branches or cross-linked structures. The side branching which is present will be short as compared to non-linear polyethylenes.

LLDPE has a density usually of from about 0.916 g/cc to about 0.940 g/cc for film making purposes. Its melt flow index generally from about 0.1 to about 10 grams per ten minutes, preferably from about 0.5 to about 3.0 grams per ten minutes. LLDPE resins of this type are commercially available and are manufactured in low pressure vapor phase and liquid phase processes using transition metal catalysts.

The first resin may alternatively be a very low density polyethylene (VLDPE). A VLDPE is typically a linear ethylene-alpha-olefin copolymer having a density of from about 0.890 to about 0.915 g/cc. VLDPEs are produced by catalytic, low pressure processes.

The additive is encapsulated in the first thermoplastic resin. The encapsulated additive is typically obtained as pellets. The pellets are typically in the range of 15 to 40 pellets per gram. Their bulk density is generally from about 0.3 to about 0.6 gram/cc. The pellet shapes are normally 3.2 mm (⅛ inch) cylindrical or cubical. Bulk factor estimates are cylindrical: 1.8, cubical: 2.2. Suitable pellets are available for some additives under the trade mark Nourymix (Akzo).

The encapsulated additive is blended in step (i)-with a second thermoplastic resin which has a lower melt temperature than the first resin. The melting point of the second resin may therefore be from about 120° to 180° C. The melting point temperature difference between the two resins is generally from about 100° to about 15° C., for example from about 70° to about 250° C. and preferably from about 60° to about 500° C. This may be checked by standard DSC laboratory methods. The temperature difference should be such that the first resin encapsulating the additive becomes fully surrounded with melted second resin before itself melting during extrusion from a die.

The second resin is preferably an ethylene-vinyl acetate copolymer (EVA). In EVA the units derived from ethylene are present in the major proportion whilst the vinyl acetate-derived units are present in a minor amount. Other polymers suitable for use as the second resin include LDPE, ultra low density polyethylene and VLDPE.

A multilayer film is formed by extruding
  the blend to provide one layer and
  respective thermoplastic resins, which may be the same or different, to provide the other layers.

The blend and the thermoplastic resins for the other layers are typically melt-extruded. The blend is generally extruded as the core layer. The two further layers on each side of a core layer form the outer surface of the film in the case of a three layer film. Alternatively additional layers may be laminated to the further layers, as in a five layer film. The two further layers coextruded with the core layer do not then form the outer skin layers of the film but rather form intermediate layers. The outer layers of the film may be the same or different. They may comprise any thermoplastic resin such as an ethylene homopolymer, an ethylene-propylene copolymer (EPC), a propylene hompolymer (PP) and EVA. The ethylene homopolymer may be LLDPE, LDPE, linear medium density polyethylene (LMDPE), MDPE or VLDPE. In a preferred film, the skin layers both are composed of about 87½% by weight EPC and 12½% by weight PP.

One or more intermediate layers can be provided between the core layer and each skin layer. Typically the or each intermediate layer comprises the second thermoplastic resin used in the preparation of the core layer. Preferably the or each intermediate layer is composed of LLDPE, EVA, a vinylidene chloride-vinyl chloride copolymer (PVDC/PVC) such as Saran, an ethylene-vinyl alcohol copolymer (EVOH) or nylon. EVA can act as a tie layer to bond, for example, a PE core layer to a PP or EPC outer layer. PVDC/PVC can provide barrier properties. Nylon can provide barrier and mechanical properties. The intermediate layer also may comprise a migrating additive which may be encapsulated as above. The intermediate layers may have the same or a different composition.

A preferred film has a five-layer construction, with an intermediate layer provided between the core layer and each outer layer. The film may be heat shrinkable. The thickness of the film may vary from 10 to 250 μm, for example from 10 to 40 μm, depending upon its final use. A suitable film has a thickness of about 15μm. For three-layer films, each layer is typically 33±25%, for example 35±10%, of the total thickness. For five-layer films, each layer is typically 20±12%, for example 20±5%, of the total thickness.

The additive is released from the layer in which it is provided, typically the core layer, and migrates through the or each said further layer to the surface of the fill. The release of additive therefore occurs over a period of time and can be controlled by varying various features. These include.

1. Additive concentration

The additive concentration can be easily set by the concentration of the encapsulated additive in the blend from which the core layer is formed and by the thickness of the core layer. A relatively small loss of additive during the extrusion of the layer can be catered for. Typically a film comprises from 1000 to 10000 ppm, suitably from 1000 to 5000 ppm and more suitably from 1000 to 4000 ppm, for example from 1600 to 3400 ppm, by weight of the additive immediately after extrusion. The concentration of pellets of encapsulated additive which are blended with the second. Thermoplastic resin can therefore be appropriately- adjusted. For example, from 0.5 to 20%, such as from 1 to 20%, by weight of the blend may comprise the first resin and the additive encapsulated in that resin. A suitable amount is from 2 to 10% by weight. A preferred amount is about 5% by weight.

2. Intermediate and skin layer thickness

The rate of migration of the additive to the film surface can be increased or decreased by varying the thickness of the intermediate layer(s), if present, and the skin layers. Increasing the thickness decreases the diffusion rate of additive.

3. The choice of resin for the intermediate and skin layers

The diffusion rate of the additive can also be adjusted with the choice of the resin for the skin layers and for the intermediate layer(s) if present. For example the diffusion rate is higher for layers composed of ethylene polymers than for polypropylene layers.

The effectiveness and life expectancy of the film containing the additive is therefore determined by the additive concentration, the thickness of the layers of the film and the construction of the film, including whether there are intermediate layers present. Other additives can be present in the film as well. Slip and/or anti-block agents may be incorporated in the film. Also, a fine mist of a silicone or anti-fog spray may be applied to the interior of freshly extruded tubular material in order to improve the processability of the material.

A preferred anti-block agent is silica, for example that available from Johns Manville under the trade mark White Mist. Preferred slip agents are erucamide (available from Humko Chemical undet the trade mark Kemamide E), stearamide (available from the Humko Chemical Company under the trade mark Kemamide S) and N, N'-dioleoylethylenediamine (available from Glyco Chemical under the trade mark Acrawax C). A preferred silicone spray is a liquid polyorganosiloxane manufactured by General Electric under the trade designation General Electric SF18 polydimethylsiloxane.

The general ranges for inclusion or, in the case of the silicone spray, application, of said other additives are as follows (ppm are by weight):

(1) silica: 250–3000 ppm
(2) N,N'-dioleoylethylenediamine: 200–4000 ppm
(3) erucamide: 200–5000 ppm
(4) stearamide: 200–5000 ppm
(5) silicone spray: 0.5 mg/ft$^2$ (about 5 mg/m$^2$) or more.

A multilayer film is preferably formed according to the invention by coextrusion of all of the layers including intermediate layers if present. The die through which extrusion occurs may be a planar (sheet) or tubular die. It is maintained at a temperature above the melt temperature of the first thermoplastic resin. Alternatively, a film comprising more than three layers can be prepared by extrusion coating. In this case, after step (ii) of the present process additional layers are coated as required onto the or each said further layer laminated to the core layer.

In order to prepare a heat-shrinkable film, the multilayer film, after being initially cooled by, for example, cascading water quenching, is reheated to within, its orientation temperature range and oriented by stretching. The stretching to orient may be accomplished in many ways such as, for example, by "blown bubble" techniques or "tenter framing". After being stretched, the film is quickly quenched while substantially retaining its stretched dimensions to cool rapidly the film and thus set or lock-in the oriented molecular configuration. After setting, the film is typically stored in rolls.

In the preferred process for making a multi-layer film of the present invention the basic steps are coextruding the layers to form a multilayer film and then stretching the film to biaxially orient. The process begins by blending, where necessary, the raw materials for layers of the film. Resins are usually purchased from a supplier in pellet form and can be blended in any one of a number of commercially available blenders. During the blending process any further additives and/or agents which are desired to be utilized are also incorporated, as well as the pellets of encapsulated additive for the core layer.

The materials are then fed to the hoppers of extruders which feed a coextrusion die. For the preferred five-layer film having two identical skin layers and two identical intermediate layers, at least 3 extruders need to be employed: one for the two skin layers, one for the two intermediate layers and one for the core layer. Additional extruders may be employed if a film having non-identical skin layers or non-identical intermediate layers is desired.

The materials are coextruded as a relatively thick tube or "tape" which has an initial diameter dependent upon the diameter of the coextrusion die. The final diameter of the tubular film is dependent upon the racking ratio, e.g. the stretching ratio. Circular coextrusion dies are well known to those in the art and can be purchased from a number of manufacturers. In addition to tubular coextrusion, slot dies could be used to coextrude the material in sheet form. Single or multi-layer extrusion coating processes could also be utilized, if desired.

Following coextrusion and quenching to cool and solidify the tape, the extruded tape is reheated and inflated into a bubble by application of internal air pressure thereby transforming the narrow tape with thick walls into a wide film with thin walls of the desired film thickness and width. This process is sometimes referred to as the "trapped bubble technique" of orientation or as "racking". The degree of inflation and subsequent stretching is often referred to as the "racking ratio" or "stretching ratio". For example, a transverse racking or stretching ratio of 2.0 Would mean that the film had been stretched 2.0 times its original extruded size in the transverse direction during transverse racking.

After stretching, the tubular film is then collapsed into a superimposed lay-flat configuration and wound into rolls often referred to as "mill rolls". The racking process orients the film by stretching it transversely and longitudinally and thus imparts shrink capabilities to the film. Additional longitudinal or machine direction racking or stretching may be accomplished by revolving the deflate rollers which aid in the collapsing of the "blown bubble" at a greater speed than that of the rollers which serve to transport the reheated "tape" to the racking or blown bubble area.

Preferred transverse and longitudinal stretching ratios of the present film range from between about 2.5 transverse by about 3.0 longitudinal to about 5.0 transverse, and about 5.0 longitudinal.

After setting the stretch-oriented molecular configuration the film may then be stored in rolls and utilized to package tightly a wide variety of articles. In this regard, the product to be packaged may first be enclosed in the heat shrinkable material by heat sealing the shrink film to itself where necessary and appropriate to form a pouch or bag and then inserting the product therein. If the material was manufactured by "blown bubble" techniques the material may still be in tubular form or it may have been slit and opened up to form a sheet of film material. Alternatively, a sheet of the material may be utilized to over-wrap the product.

Thereafter, the enclosed product may be subjected to elevated temperatures by, for example, passing the enclosed product through a hot air or hot water tunnel. This causes the enclosing film to shrink around the product to produce a tight wrapping that closely conforms to the contour of the product. As stated above, the film sheet or tube may be formed into bags or pouches and thereafter utilized to package a product. In this case, if the film has been formed as a tube it may be preferable to first slit the tubular film to form a film sheet and thereafter form the sheet into bags or pouches.

In order to prepare a non-heat shrinkable film, the film may be formed from a non-orientable material or, if formed from an orientable material may be "hot blown". In forming a hot blown film, the multilayer film is not cooled immediately after having been formed. Rather it is first stretched shortly after extrusion while the film is still at an elevated temperature above the orientation temperature range of the material. Thereafter, the film is cooled. Another method of forming a non-heat shrinkable film is by cast coextrusion. The non-heat shrinkable film is also typically stored on rolls and used to wrap articles as desired. Such films may also be heat-sealable.

Any article which it is desired to package may be wrapped in a film produced according to the invention. When the additive is a fungicide, an article can be protected from fungal infection. The articles may be fruits, for example citrus fruit, such as oranges, lemons and grapefruit; other fruit such as bananas, apples, pears, pineapples, melons, persimmon, avocado, squash and pumpkins; or vegetables such as cucumber, peppers, potato and tomato.

The following Examples illustrate the invention. Two Comparative Examples are provided as well.

Comparative Example 1

Approximately 1% by weight powdered Imazalil was high-shear mixed with DOWLEX 2045 pellets, which is a LLDPE (DOWLEX is a trade mark). The resulting blend was extruded with outer skin layers on an angular coextrusion die. The extrusion conditions were set above the melt temperature in a conventional profile. High losses of Imazalil occurred during extrusion due to volatilisation, over 50%. The odour and fumes attributable to the volatilised Imazalil were unpleasant. The film was oriented at a low ratio of 2.5:1 transverse and 2.5:1 longitudinal at a temperature of 980° C. The total loss of Imazalil after racking was 80 to 90%.

The concentration of Imazalil in the final film was determined by gas chromatographic analysis as follows:

Preparation of the sample

The sample (four square decimeters) was collected after a few meters from the beginning of the film roll, weighed and extracted for 8 hours in an Erlenmeyer flask, under reflux using boiling ethyl alcohol. The extraction solution was diluted to 100 ml adding di-n-ethyl-esyl adipate as an internal standard.

Gas Chromatographic Analysis

A 3μl aliquot was injected into a gas-chromatographer (Perkin Elmer—Model 8310) on a bonded phase methyl silicone capillary column 50 meters length, 0.53 mm internal diameter with F.I.D. detection using the following conditions:
  Oven temperature 1: 140° C.
  Isothermal Time: 4 min.
  Oven Temperature 2: 250° C.
  Injector Temperature: 260° C.
  Detector Temperature: 300° C.
The content of Imazalil was calculated on the chromatogram obtained using the ratio of the peaks of Imazalil and of the internal standard and a calibration curve built with standard samples of known Imazalil concentration.

EXAMPLE 1

Imazalil was encapsulated in DOWLEX 2045. The Imazalil was incorporated in the DOWLEX 2045 in an amount of 50% by weight relative to the weight of the pellets obtained. These pellets contain Imazalil in the voids of a sponge-like matrix of LLDPE.

A five-layer film was produced having the composition shown in Table 1.

TABLE 1

| Layer No. | Thickness as a proportion of the final film | Composition by weight of each layer |
|---|---|---|
| 1 (skin) | 20% | 87½% ELTEX (Trade Mark) PKS-400* + 12½% PROFAX (Trade Mark) PD-064* |
| 2 (substrate) | 22% | DOWLEX 2045 |
| 3 (core) | 16% | 95% ELVAX LD-362* + 5% encapsulated Imazalil pellets |
| 4 (substrate) | 22% | same as layer 2 |
| 5 (skin) | 20% | same as layer 1 |

*ELTEX PKS-400 is an ethylene-propylene copolymer (EPC) from Solvay. PROFAX PD-064 is a polypropylene homopolymer (PP) from Himont. ELVAX LD-362 is an ethylene-vinyl acetate copolymer (EVA) from Essochem.

The materials for each layer, after blending in the case of the materials for layers 1, 3 and 5, were fed into an appropriate extruder to produce an annular five-layer tape with a thickness of 375 μm. The extruder type was at follows:

| | Size | Resin |
|---|---|---|
| Extruder 1 | 11.4 cm (4½ inch) | Skin layers 1 and 5 |
| Extruder 2 | 11.4 cm (4½ inch) | Substrate layers 2 and 4 |
| Extruder 3 | 6.4 cm (2½ inch) | Core layer 3 |

The extrusion conditions were set in a conventional temperature profile slightly above (0° to 500° C.) the melting point of the resin. The tape was then oriented to a final film thickness of 15 μm. This was achieved by stretching biaxially in a bubble process after heating the tape to 1130°±3° C. (235°±5° F.). The resulting film was designated EFDX-0049 and was racked at an orientation ratio of 5.0:1 longitudinal and 5.0:1 transverse.

The Imazalil was initially provided in an amount of 4000 ppm by weight relative to the total amount of material to be extruded. The final amount of Imazalil in EFDX-0049 was 3310 ppm immediately after extrusion and six weeks after the film was produced. The loss of Imazalil was only 17.3% by weight. The odour of Imazalil was only slightly noticeable at the top of the racking machine.

Comparative Example 2

Example 1 was repeated except that ELVAX LD-362 was replaced by DOWLEX 2045 in the core layer 3. The resulting film was designated EFDX-0051. In EFDX-0051, therefore, the LLDPE which encapsulated the Imazalil and the LLDPE with which the encapsulated Imazalil pellets were blended were the same. In other words, there was no difference between the melt temperature of the polymer encapsulating the Imazalil and that of the polymer with which the encapsulated Imazalil pellets were blended.

As in the case of EFDX-0049 of Example I,, the Imazalil was provided in an initial amount of 4000 ppm by weight for EFDX-0051. However, there were large losses of Imazalil during the production of EFDX-0051. The fungicide odour was objectionable. The final amount of Imazalil was 2350 ppm immediately after extrusion of EFDX-0051, a loss of 41.3%.

EXAMPLE 2

The fungicide activity of the 1,5pm EFDX-0049 (15μEFDX-0049) was verified with microbiological lab tests. The following selected mold strains were obtained from the "Central Bureau voor Schimmelcultures" Institute in Baron (The Netherlands):
Penicillin Digitatum: CBS 319.48
Penicillin Italicum var. *Italicum:* CBS 136.41

These were inoculated at various concentrations on Petri dishes containing Malt Agar. Samples of the 15,μ EFDX-0049 film and of a film coded 15μ MD, having the same formulation as 15μ EFDX-0049 but not containing Imazalil (core layer 3 of Example 1 consisted only of ELVAX LD-362.) were laid on top of the Agar Malt on one third each of the Petri dishes. The remaining third of the dishes were left uncovered and used as reference for mold growth ("None 15μ".

After a 7-day incubation at 20°-25° C., the number of mold colonies grown was counted. The results are shown in Table 2. It is evident that the 15μ EFDX-0049 was very active in reducing the growth of the moulds (97-100% growth reduction) compared to the reference, whilst the 15μ MD film was not active. It was concluded that the agent responsible for this reduction was the Imazalil contained in the 15μ EFDX-0049 film.

TABLE 2

Fungicide activity of the 15μ EFDX-0049 film: Petri dish test on "*Penicillium Digitatum*" and "*Penicillium Italicum* var. *Italicum*".

| | FILM | | |
|---|---|---|---|
| | NONE 15μ | EFDX-0049 | 15μ MD |
| 1. *PENICILLIUM DIGITATUM* | | | |
| MOULD COUNT[a] | $8.51 \cdot 10^6$ | $3.98 \cdot 10^2$ | $3.47 \cdot 10^6$ |
| REDUCTION % | — | 99.9 | 59.3 |
| 2. *PENICILLIUM ITALICUM* var. *ITALICUM* | | | |
| MOULD COUNT[a] | $1.51 \cdot 10^8$ | 0 | $6.72 \cdot 10^7$ |
| REDUCTION % | — | 100 | 55.6 |

[a] After incubation at 20°-25° C. for 7 days

EXAMPLE 3

Packaging shelf-life tests were conducted on oranges to assess the performance of the (15μ) EFDX-0049 film to control mold growth. The tests were carried out on four varieties of oranges grown in Southern Italy, namely: "Navelina", ValenciaII, "Tarocco", "Moro". The oranges, after picking, were washed in water containing 5g/l of sodium ortho phenyl phenate (SOPP) and brushed. After drying in a tunnel with warm air, the oranges were sorted to eliminate the damaged ones.

Oranges to be packed were then sent directly to the packaging equipment. This consisted of a vertical-form-fill-seal (VFFS) machine (Cryovac (Trade mark) MM 120), supplied with longitudinal electrostatic seal and transversal trim seal, and a hot air shrink tunnel (Cryovac ST 200). The oranges were individually wrapped on the VFFS machine and then shrunk in the hot air tunnel.

A total of 200 kg of oranges were packed for each variety tested and placed in 10 crates each containing 20 kg of fruit. These were stored partly at about 80° C. (6 crates) and partly at ambient temperature (4 crates). In the tests on the Tarocco and moro varieties, also oranges subjected to the same washing and sorting procedures were individually shrink wrapped on the same equipment in the 15μ MD film described in Example 2. The amount of oranges packed and storage conditions were as before.

The tests were carried out in comparison with oranges treated as usually done by citrus growers; i.e. after sorting, these were sprayed with a solution of wax (FMC Flavourseal) containing 2000 ppm of Imazalil. Storage conditions were as before.

Checks were performed periodically to determine rate of mold growth on the oranges. The results are shown in Tables 3, 4, 5, 6.

TABLE 3

PACKAGING SHELF-LIFE TESTS ON "NAVELINA" ORANGES: MOULD GROWTH CONTROL

| PACKAGING MATERIAL | FRUIT TREATED WITH IMAZALIL | % OF MOULDED FRUIT DAYS OF STORAGE | | | | | |
|---|---|---|---|---|---|---|---|
| | | 15 | 30 | 45 | 60 | 90 | 120 |
| | | AMBIENT CONDITIONS | | | | | |
| NONE | YES | 1.3 | 2.3 | (a) | | | |
| 15μ EFDX-0049 | NO | (b) | 0.8 | 2.7 | 3.5 | (a) | |
| | | REFRIGERATED (8° C.) | | | | | |
| NONE | YES | (b) | 0.9 | (b) | 4.1 | (a) | |
| 15μ EFDX-0049 | NO | (b) | 0 | 1.6 | 0.8 | 4.3 | 3.5 |

(a) TEST STOPPED BECAUSE ORANGES DISCARDED DUE TO EXCESSIVE WILTING
(b) NOT CHECKED

TABLE 4

PACKAGING SHELF-LIFE TESTS ON "TAROCCO" ORANGES: MOULD GROWTH CONTROL

| PACKAGING MATERIAL | FRUIT TREATED WITH IMAZALIL | % OF MOULDED FRUIT DAYS OF STORAGE | | | | | |
|---|---|---|---|---|---|---|---|
| | | 15 | 30 | 45 | 60 | 90 | 120 |
| | | AMBIENT CONDITIONS | | | | | |
| NONE | YES | 3.6 | 5.3 | (a) | | | |
| 15μ EFDX-0049 | NO | (b) | 6.7 | 13.2 | 20.0 | (a) | |
| 15 μ MD | NO | 31.6 | 73.3 | (c) | | | |
| | | REFRIGERATED (8° C.) | | | | | |
| NONE | YES | (b) | 5.4 | (b) | 13.3 | (a) | |
| 15μ EFDX-0049 | NO | (b) | 9.8 | (b) | 10.0 | 15.4 | 19.4 |
| 15μ MD | NO | 23.2 | 40.0 | 76.6 | (c) | | |

(a) AS IN TABLE 3
(b) AS IN TABLE 3
(c) TESTS STOPPED OWING TO EXCESSIVE MOULD GROWTH

TABLE 5

PACKAGING SHELF-LIFE TESTS ON "MORO" ORANGES: MOULD GROWTH CONTROL

| PACKAGING MATERIAL | FRUIT TREATED WITH IMAZALIL | % OF MOULDED FRUIT DAYS OF STORAGE | | | | | |
|---|---|---|---|---|---|---|---|
| | | 15 | 30 | 45 | 60 | 90 | 120 |
| *AMBIENT CONDITIONS* | | | | | | | |
| NONE | YES | 1.2 | 2.5 | (a) | | | |
| 15μ EFDX-0049 | NO | (b) | 11.4 | 15.0 | 17.5 | (a) | |
| 15 μ MD | NO | 43.3 | 83.3 | (c) | | | |
| *REFRIGERATED (8° C.)* | | | | | | | |
| NONE | YES | (b) | 1.2 | (b) | 7.7 | (a) | |
| 15μ EFDX-0049 | NO | (b) | 2.0 | (b) | 8.6 | 11.4 | 15.0 |
| 15μ MD | NO | 40.0 | 45.0 | 80.0 | (C) | | |

(a) AS IN TABLE 3
(b) AS IN TABLE 3
(c) AS IN TABLE 4

TABLE 6

PACKAGING SHELF-LIFE TESTS ON "VALENCIA" ORANGES: MOULD GROWTH CONTROL

| PACKAGING MATERIAL | FRUIT TREATED WITH IMAZALIL | % OF MOULDED FRUIT DAYS OF STORAGE | | | | | |
|---|---|---|---|---|---|---|---|
| | | 15 | 30 | 45 | 60 | 90 | 120 |
| *AMBIENT CONDITIONS* | | | | | | | |
| NONE | YES | 1.0 | 2.4 | (a) | | | |
| 15μ EFDX-0049 | NO | (b) | 3.8 | 6.4 | 9.7 | (a) | |
| *REFRIGERATED (8° C.)* | | | | | | | |
| NONE | YES | (b) | 1.6 | (b) | 5.3 | (a) | |
| 15μ EFDX-0049 | NO | (b) | 2.1 | (b) | 4.1 | 8.2 | 19.6 |

(a) AS IN TABLE 3
(b) AS IN TABLE 3

EXAMPLE 4

Two five-layer films were produced as described in Example 1 but having lower concentrations of Imazalil than the 15μ EFDX-0049 film. This was achieved by adjusting the percentage of encapsulated Imazalil pellets in the core layer of the film to 3.375% and 1.625% respectively. The initial amount of Imazalil in relation to the material to be extruded and the final amount of Imazalil immediately after extrusion of each film are:

| FILM | INITIAL CONCENTRATION | FINAL CONCENTRATION |
|---|---|---|
| 15μ EFDX-0400 | 1300 ppm | 1000 ppm |
| 15μ EFDX-0401 | 2700 ppm | 2000 ppm |

The concentration of Imazalil in the films was measured as described in Comparative Example 1. The fungicide fumes produced during the production of each film were nearly unnoticeable and would have been unnoticeable with improved ventilation above the racking machine.

EXAMPLE 5

Packaging shelf-life tests were conducted on "Valencia" oranges to assess the performance of the 15μ EFDX-0400 and 15μ EFDX-0401 films to control mold growth, in comparison with 15μ EFDX-0049. The oranges were prepared, packed and checked as described in Example 3 for 15μ EFDX-0049 the results are shown in Table 7.

TABLE 7

Packaging shelf-life tests: effect of film containing various concentration of Imazalil on mould growth control on "Valencia" oranges.

| PACKAGING MATERIAL | IMAZALIL CONTENT (ppm) | % OF MOULDED FRUIT DAYS OF STORAGE | | | |
|---|---|---|---|---|---|
| | | 30 | 45 | 60 | 90 |
| *AMBIENT CONDITIONS* | | | | | |
| 15μ EFDX-0049 | 3310 | 2.5 | 6.3 | (a) | |
| 15μ EFDX-0401 | 2000 | 3.3 | 9.1 | (a) | |
| 15μ EFDX-0400 | 1000 | 4.8 | 14.2 | (a) | |
| *REFRIGERATED (8° C.)* | | | | | |
| 15μ EFDX-0049 | 3310 | 0.5 | 1.7 | 3.8 | 5.5 |
| 15μ EFDX-0401 | 2000 | 1.3 | 1.9 | 4.4 | 5.6 |
| 15μ EFDX-0400 | 1000 | 1.3 | 2.8 | 5.8 | 6.0 |

(a) TEST STOPPED
NOTE: The test did not last as the previous ones since it was meant only to verify the comparative performance of the three films.

We claim:

1. A composition comprising a blend of:
   a) a migratable additive encapsulated in a first thermoplastic resin having a melting point of between 170° C. to 240° C.; and
   b) a second thermoplastic resin having a melting point of between 120° C. and 180° C.;
   the blend further characterized in that the second thermoplastic resin has a melting point at least 15° C. lower than the melting point of the first thermoplastic resin; and
   the additive is capable of migrating into the second thermoplastic resin.

2. A composition according to claim 1, wherein the first thermoplastic resin is linear low density polyethylene or very low density polyethylene.

3. A composition according to claim 1 wherein the second thermoplastic resin is an ethylene-vinyl acetate copolymer.

4. A composition according to claim 1, wherein the additive is provided in such an amount that the composition contains from 1000 to 4000 ppm by weight thereof.

5. A composition according to claim 1, in which the additive is a fungicide, wax or antifogging agent.

6. A composition according to claim 5 in which the fungicide is 2,3,5,6-tetrachloro-1,4-benzoquinone; 2,3-dichloro-1,4-naphthoquinone; teramethylthiuram disulphide; disodium ethylenebisdithiocarbamate, heptadecyl-2-imidazolinium acetate; N-(trichloromethylthio)-4-cyclohexane-1,2-carboxamide; N-(trichloromethylthio)-phthalimide; 2,3,5,6-tetrachloronitrobenzene; pentachloronitrobenzene; 1,2,4-trichloro-3,5-dinitrobenzene; 1,3,5-trichloro-3,4,6-trinitrobenzene; hexachlorobenzene or tetracholoroisophthalonitrile.

* * * * *